Dec. 15, 1959     E. FRANKE ET AL     2,917,351
BEARINGS
Filed April 18, 1957     7 Sheets-Sheet 1

INVENTORS
Erich Franke and
Egon Franke
By Michael S. Striker
agt.

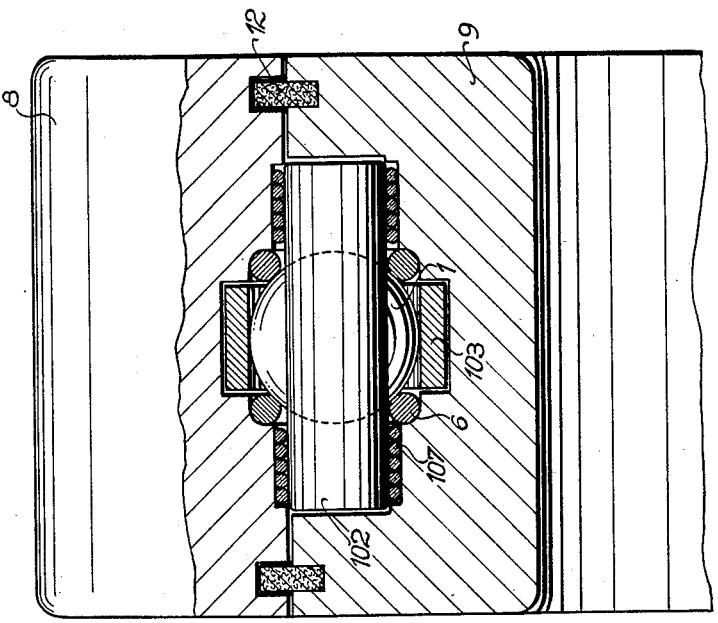
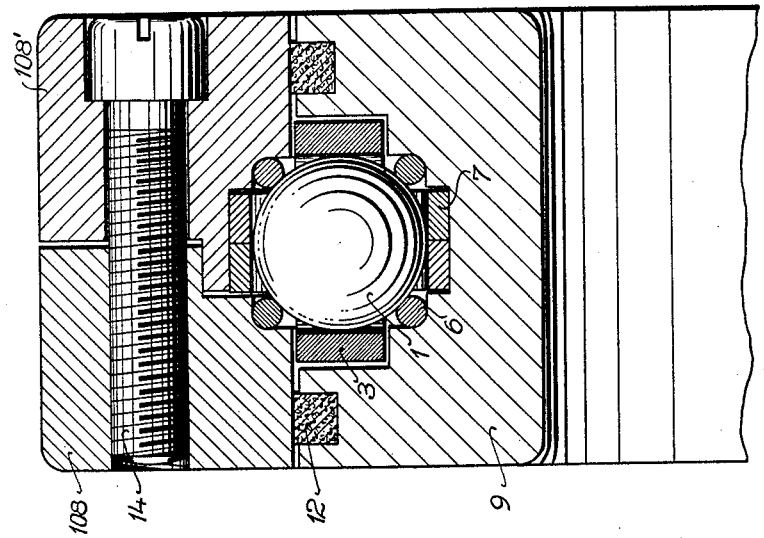

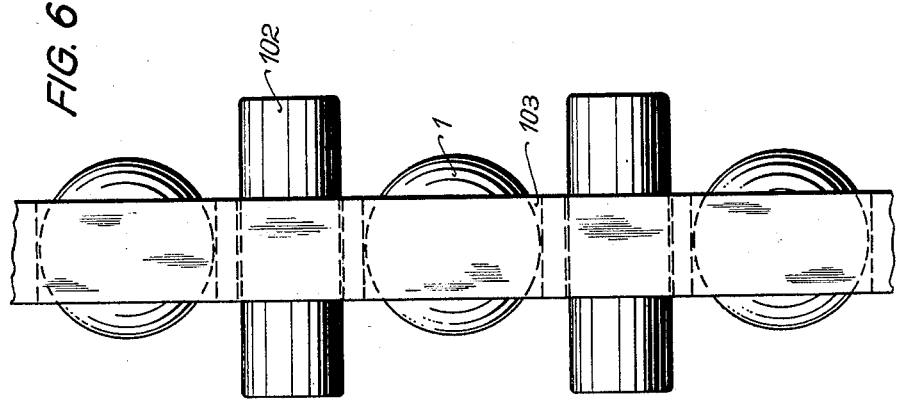
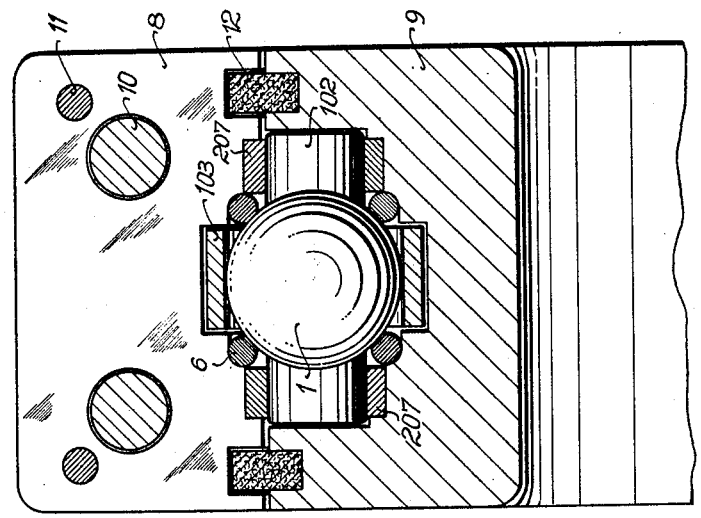

Dec. 15, 1959  E. FRANKE ET AL  2,917,351
BEARINGS
Filed April 18, 1957  7 Sheets-Sheet 4
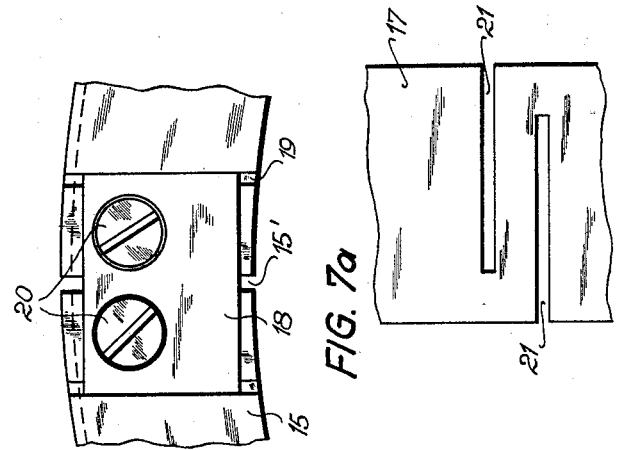
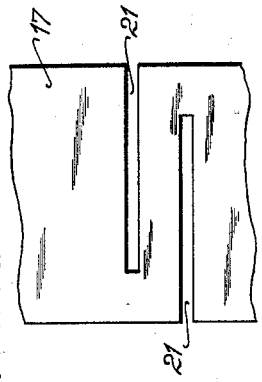
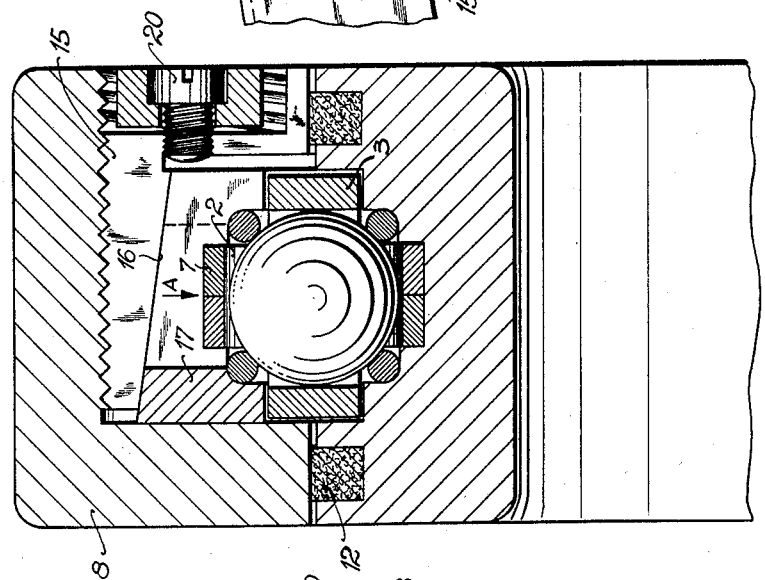
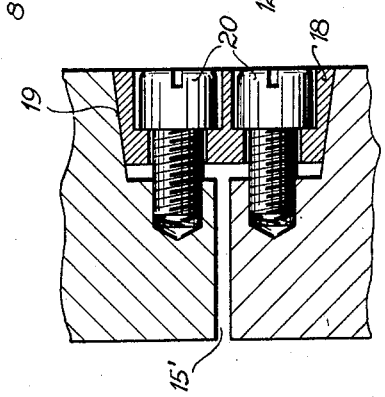
INVENTORS
Erich Franke and
Egon Franke
BY Michael S. Striker

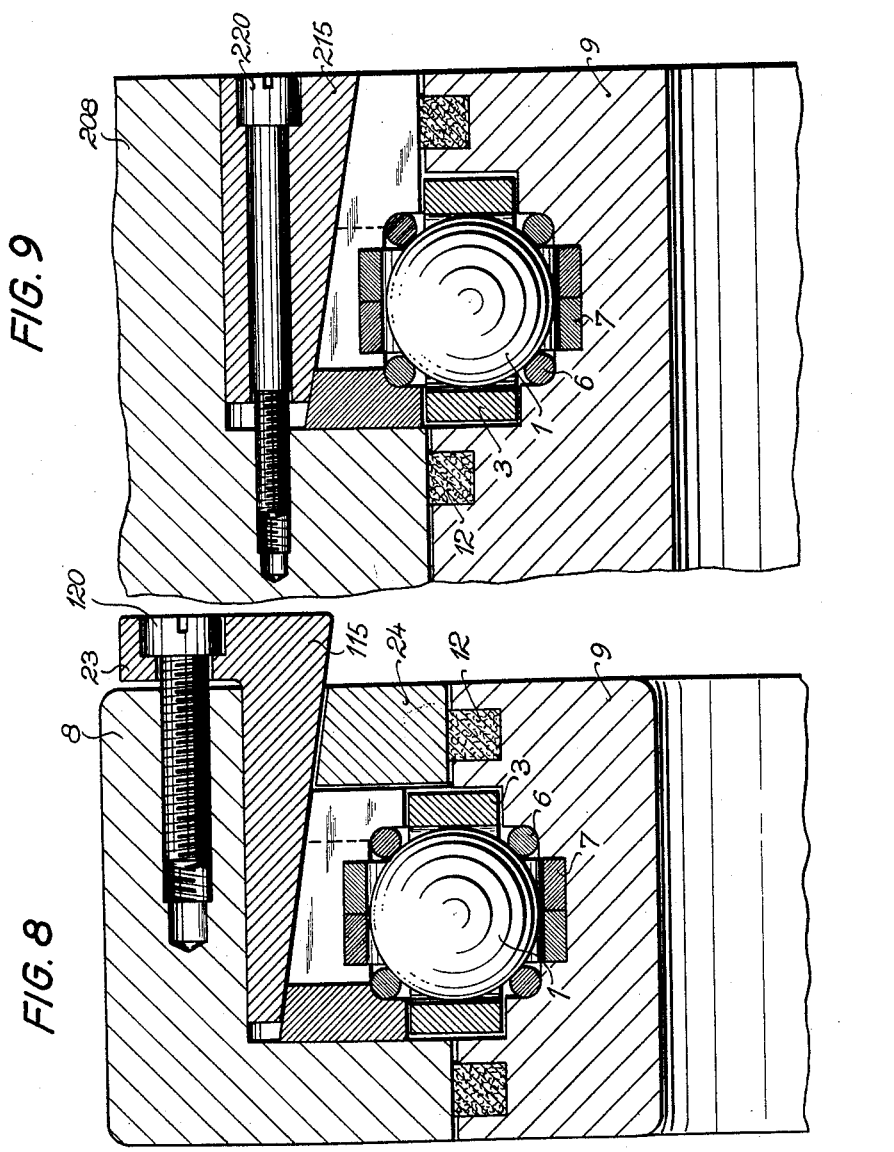

Dec. 15, 1959  E. FRANKE ET AL  2,917,351

BEARINGS

Filed April 18, 1957  7 Sheets-Sheet 6

INVENTORS
Erich Franke and
Egon Franke
By Michael S. Striker
agt.

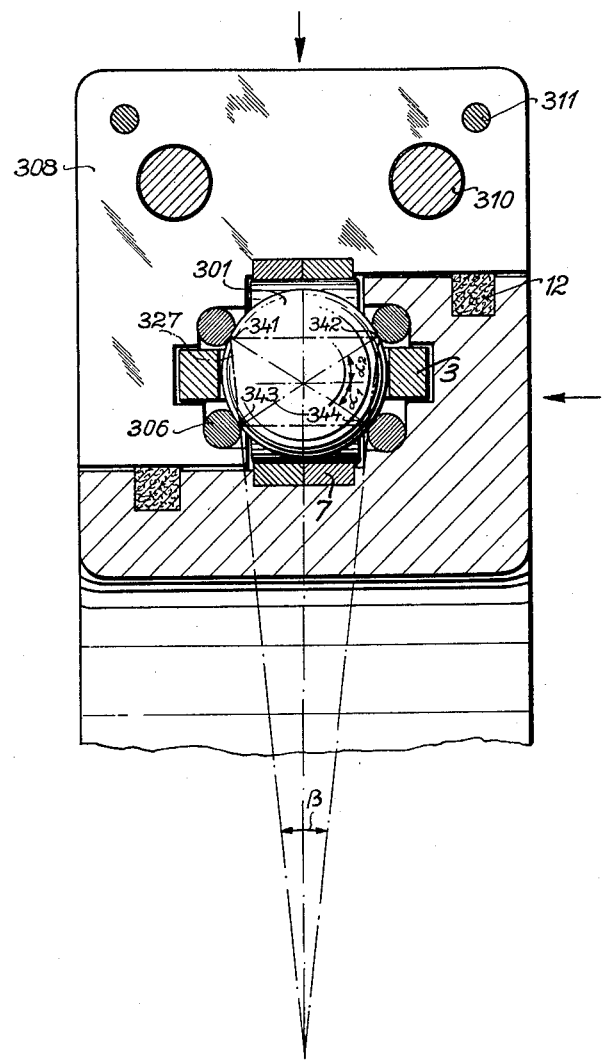

United States Patent Office 2,917,351
Patented Dec. 15, 1959

2,917,351
BEARINGS

Erich Franke and Egon Franke, Heidenheim (Brenz), Germany, assignors to Firma Franke & Heydrich K.G., Heidenheim (Brenz), Germany Application April 18, 1957, Serial No. 653,689

Claims priority, application Germany April 30, 1956

9 Claims. (Cl. 308—174)

The present invention relates to bearings.

More particularly, the present invention relates to that type of bearing wherein inner and outer bearing rings are arranged so that one is rotatable with respect to the other, balls, rollers, or the like being provided between raceways in order to provide the rotational movement of one of the bearing rings with respect to the other.

One of the objects of the present invention is to provide a bearing which combines the advantages of both ball and roller bearings.

Another object of the present invention is to provide a bearing of the above type capable of withstanding relatively great axial and radial forces and having wire races.

A further object of the present invention is to provide a process for making a bearing capable of accomplishing the above objects.

An additional object of the present invention is to provide a bearing capable of controlling the turning axes of ball members of the bearing when the latter is placed under axial stress.

With the above objects in view, the present invention mainly consists of a bearing which includes an outer bearing ring and an inner bearing ring located coaxially within the outer bearing ring, these bearing rings defining between themselves a predetermined annular space. A plurality of balls and rollers are distributed along this annular space, and a cage means is located within the annular space and cooperates with the balls and rollers to maintain them at predetermined angular distances from each other. A plurality of wire races are carried by the inner and outer bearing rings and engage the balls and rollers during rotation thereof.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 3 is a fragmentary sectional elevational view of another embodiment of a bearing according to the present invention, the section of Fig. 3 also being taken transversely across the bearing;

Fig. 4 is a fragmentary partly sectional elevational view of another embodiment of a bearing according to the present invention, the section of Fig. 4 being taken transversely across the bearing;

Fig. 5 is a fragmentary transverse sectional view of a further embodiment of a bearing according to the present invention;

Fig. 6 is an elevational fragmentary view of a cage means used in the bearing of Fig. 5, the cage means being shown together with balls and rollers;

Fig. 7 is a fragmentary transverse sectional view of a further embodiment of a bearing according to the present invention;

Fig. 7a is a fragmentary elevational view of an expandible wedging ring used in the bearing of Fig. 7;

Fig. 7b is a sectional fragmentary view showing an expanding structure used for expanding a wedging ring of the embodiment of Fig. 7;

Fig. 7c is a fragmentary side elevational view of the expanding means of Figs. 7 and 7b;

Fig. 8 is a fragmentary transverse sectional view of another embodiment of a bearing according to the present invention having an adjustable wedging structure;

Fig. 9 is a fragmentary transverse sectional view of a further embodiment of a bearing having an adjustable wedging structure;

Fig. 12 is a fragmentary transverse sectional view of a still further embodiment of a bearing according to the present invention adapted to resist axial forces.

Figure 2:
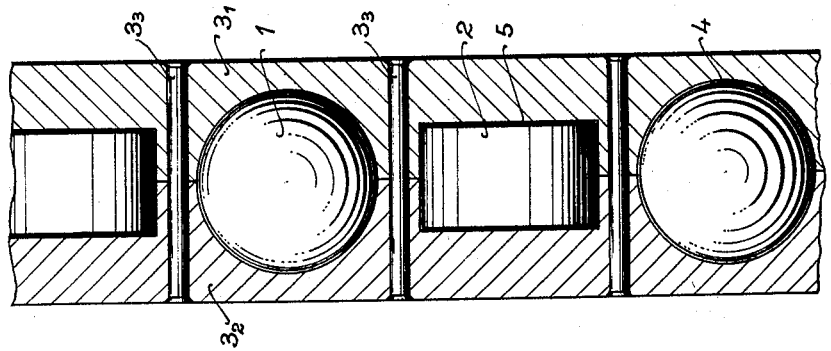
Fig. 2 is a fragmentary elevational view, in section, of a cage means used in the bearing of Fig. 1.
Figure 1:
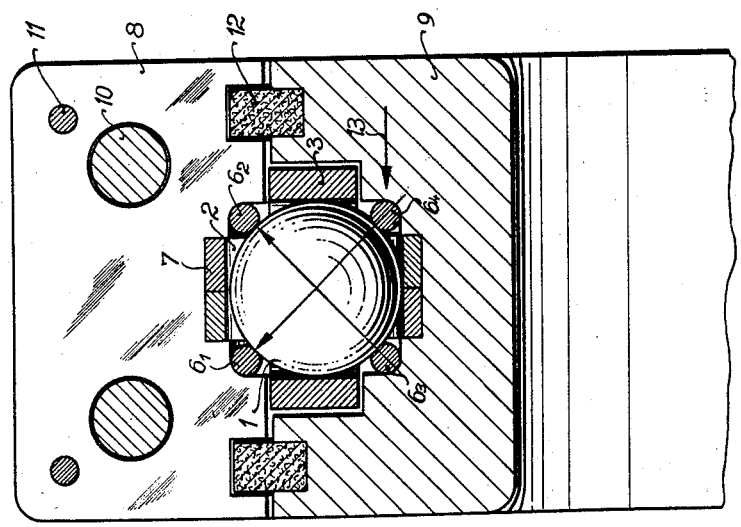
Fig. 1 is a fragmentary sectional elevational view of one possible construction of a bearing according to the present invention, the section of Fig. 1 being taken transversely across the bearing.

Referring to Figs. 1 and 2, the bearing illustrated therein includes an outer bearing ring 8 and an inner bearing ring 9 coaxially arranged within the bearing ring 8, the rings 8 and 9 defining between themselves a predetermined annular space shown in cross section in Fig. 1. A plurality of balls 1 and rollers 2 are arranged in the annular space defined between the rings 8 and 9, and as is apparent from Fig. 2 the balls and rollers alternate with each other. Thus, there may be an equal number of balls and rollers, although with any of the bearings of the invention, in accordance with particular requirements, instead of 50% cylindrical rollers and 50% balls, there may be 75% cylindrical rollers and 25% balls, for example, or any other desired combination of balls and rollers may be provided. A cage means 3 is arranged within the annular space formed between the bearing rings 8 and 9, as is evident from Fig. 1, and as is also shown in Fig. 1 the cage 3 is formed with openings which respectively receive the balls and rollers, these openings having axes which extend radially from the common axis of the rings 8 and 9. As is evident from Fig. 2 the cage means 3 may be made up of a pair of rings $3_1$ and $3_2$ located in side by side relation in the manner shown in Fig. 2, these rings $3_1$ and $3_2$ being held together by the rivets $3_3$. Fig. 2 shows the alternating recesses 4 of the cage means 3 which respectively receive the balls 1 and the alternating recesses 5 of the cage means which respectively receive the rollers 2. It will be noted that the axial length of each roller 2 is shorter than the diameter of each ball 1.

The bearing of the invention further includes a plurality of wire races carried by the rings 8 and 9 and engaging the balls and rollers. Thus, Fig. 1 shows the circular wire races $6_1$, $6_2$, $6_3$ and $6_4$ which cooperate with the balls 1, as well as the cylindrical wire races 7 which cooperate with the rollers 2. Each of the wire races 7 is of rectangular cross section, while each of the wire races $6_1$–$6_4$ is of circular configuration but is not of a truly circular cross section. Each of these wire races was originally of circular cross section and was then ground and rolled so as to have a proper surface in engagement with the balls. The wire races for the balls may be made of spring steel. Also, instead of the rings 7 being made each from one piece, it is possible to make the rings 7 from an assembly of half rings. Also, instead of rings of rectangular cross section as shown in Fig. 1, these rings being made of steel also, it is possible to replace the rings 7 with a plurality of wires of circular, rounded, or profiled cross section, these wires being arranged in side by side relation and provided with inner and outer ground surfaces. As may be seen from Fig. 1, the annular space defined between the rings 8 and 9 has a cross section of a configuration which provides annular recesses to receive the several wire races.

According to the present invention the outer ring 8 is originally formed in one piece and is then annealed and provided with holes which subsequently receive the connecting screws 10 shown in Fig. 1. The one-piece ring is secured in position by means of the pins 11 and is then divided into two halves in a plane extending across the holes which receive the screws 10. Thereafter the inner ring 9 is assembled together with the balls and rollers as well as the cage means and the wire races, and then the two parts of the ring 8 are placed in position and drawn together by the screws 10. When the ring 8 is in its proper running position shims or similar inserts are placed in the gaps between the two halves of the ring 8 and the screws 10 are tightened so as to maintain the ring 8 in proper operating position.

With the above-described bearing structure of the invention, the bearing is almost entirely relieved of load when radial forces or stresses occur, since the bearing is adjusted so as to have no play, by tightening the adjusting screws 10. Also, the raceways for the balls are rolled into the wires $6_1$-$6_4$ with balls which are slightly larger than those which are subsequently permanently included in the bearing. Before such rolling each of the rings $6_1$-$6_4$ is ground so as to be provided with an annular surface directed toward the center of each ball, and then these annular surfaces are rolled by the balls which are slightly larger than those ultimately included in the bearing. After this rolling-in operation, the smaller balls which are permanently included in the bearings are placed in position and the roller bearing has no play and is, if necessary, pre-tensioned, while the wire races which cooperate with the balls have no pre-tensioning.

In this way the ball bearing parts of the structure are not subject to any radial stresses, and if axial stresses occur in the direction of arrow 13 of Fig. 1, for example, the balls move about an axis of rotation extending between the races $6_2$ and $6_3$, as shown by the arrow directed from the race $6_3$ to the race $6_2$ in Fig. 1. If the axial stress is in a direction opposite to the arrow 13, then each ball will roll about an axis extending between the rings $6_1$ and $6_4$ as is shown by the arrow extending from the race $6_4$ to the race $6_1$ in Fig. 1. With this construction there will be no sliding friction, as is the case with conventional ball bearings. It should be noted that temporary contact of the balls with the wires $6_2$ and $6_3$ with resulting disturbance of the rotation of the balls about the axis of rotation extending between the races $6_2$ and $6_3$ is not harmful since with the bearing stressed so as to provide this axis of rotation of the ball members no forces can occur between the wires $6_2$ and $6_3$ because of the play which is permitted.

Up to the present time it has been possible to provide as a maximum a race with equal to about one-third of the diameter of a wire race, since if the rolling-in is continued beyond this extent a ridge would be formed at the edges of the race, and such a ridge would produce undesirable results. With the structure and process of the present invention, however, pre-grinding of the wires is of great advantage. Thus, according to the process of the present invention the steel wires which may have a circular cross section, for example, are bent into the predetermined circle in a horizontal plane, and are trued in a plane with a suitable gauge. Then the race surface is pre-ground, this annular race surface having the particular inclination which is desired. After such pre-working of the wires, the latter are placed in position in the bearing and only at this time are they rolled in the manner referred to above. In this way the plastic deformation of the wires to the actual ball radius is reduced to such an extent that it is possible to have race widths equal to 60% and more of the diameter of the wire forming the race. The ground surface of the wire which forms the race is located so as to be as nearly as possible perpendicular to a line extending from the center of a ball to the race wire in a plane extending cross sectionally across the race wire. When the wire races are formed in this manner torsional stressing of the wire and unsteady running of the balls are avoided.

The above-described rolling-in may be dispensed with, and a substantially similar result can be achieved by pre-grinding relatively wide ball races and by simultaneously providing only a slight clearance between the balls and their wire races.

The steel wires 7 which form the roller races may consist of a material approximately one-third softer than the material of the ball races, and the wire races 7 can also be subsequently rolled slightly so as to guarantee accurate rolling of the cylindrical rollers on the cylindrical surfaces of the wire races 7.

In order to prevent lubricant within the bearing from flowing out of the gap between the inner and outer bearing rings, and also in order to prevent dust or other foreign matter from entering into the interior of the bearing, a suitable sealing means 12 is interposed between the rings 8 and 9 extending transversely across the gap therebetween, this sealing means 12 preferably being in the form of a labyrinth packing.

As was mentioned above, with the embodiment of Figs. 1 and 2, the rollers 2 have an axial length smaller than the diameters of the balls 1, and as is evident from Fig. 1 the roller races 7 are located nearer to a plane normal to the common axis of the rings 8 and 9 and including the centers of the balls 1 than the races $6_1$-$6_4$ of the balls 1.

In the embodiment of the invention which is illustrated in Fig. 3, the outer bearing ring is in the form of a pair of ring parts located in side by side relation and held together by the screws 14, these screws 14 also serving to adjust the wire races of the balls. The two ring members 108 and 108' constitute the outer bearing ring of the embodiment of Fig. 3 and it will be noted that these ring parts are centered relatively to each other. It will be noted from Fig. 3 that the left outer ring part 108 is provided at its right face with an annular recess surrounding the inner ring 9 and directed toward the latter, while the right ring 108' is provided with an annular projection extending into this recess and slidably engaging the ring part 108 within this recess. It is this annular projection of the ring part 108' which receives at its inner annular surface the roller race rings 7, as is evident from Fig. 3. It will be noted that with the embodiment of Fig. 3 adjustment of the roller races 7 radially is not possible, so that the diameters of the wire races 7 must have very close tolerances with this embodiment of the invention.

In the embodiment of the invention which is illustrated in Fig. 4 the rollers 102 are longer than the diameters of the balls 1, and these rollers and balls are supported by a cage means 103 which is shown in elevation in Fig. 6. It will be noted that with the embodiments of Figs. 1-3 where the rollers are shorter than the diameters of the balls the cage means is provided with redially extending openings to receive the balls and rollers, while with an embodiment such as that shown in Fig. 4 where the rollers are longer than the diameters of the balls the cage means is provided with axially extending openings to receive the balls and rollers. In the embodiment of Fig. 4, instead of roller races in the form of wires 7 of rectangular cross section, the roller races take the form of a plurality of circular wires 107 arranged in side by side relation, these individual circular wires being profiled and being flattened at their inner and outer annular faces, so that the inner and outer surfaces of each wire 107 respectively form parts of cylinders. In order to provide the best possible rolling action for the rollers 102, the inner rings 107 are staggered with respect to the outer rings 107, and if race rings of rectangular cross section are used, the inner and outer race rings for the rollers are also staggered with respect to each other, so that in this way there will not be provided between the inner and outer race rings abutting surfaces located in a common plane so as to provide possible disturbances during the operation.

It will be noted that in Fig. 3 as well as in Fig. 5 the wire races for the balls are indicated by the numeral 6, while in Figs. 4 and 5 as well as in Fig. 6 the rollers are indicated by the reference character 102.

The embodiment of Fig. 5 is identical with that of Fig. 4, the essential difference being that instead of groups of wires 107 to provide races for the rollers 102, wires 207 of rectangular cross section are provided, as indicated in Fig. 5. The embodiments of Figs. 4 and 5 are capable of withstanding much greater radial loads than the embodiments of Figs. 1 and 3. The reason for this is that in Figs. 1 and 3 it is necessary to locate the races for the rollers between the races for the balls, so that there is a limitation to the axial length along which the roller races may extend. However, in the embodiments of Figs. 4 and 5 since the rollers are longer than the diameters of the balls and extend beyond the latter, it is possible to locate the races for the rollers beyond the races for the balls, and thus the rollers as well as the races may extend to any desired axial length since their length is in no way limited by the ball races, and thus it is possible with the embodiments of Figs. 4 and 5 to provide a bearing capable of withstanding much greater radial loads.

The embodiment of the invention which is shown in Fig. 7 is similar to that of Fig. 1 except that a different adjusting structure is provided. With the embodiment of Fig. 7 the outer bearing ring 8 is provided with an annular recess directed toward the inner bearing ring, and this annular recess is provided with a threaded surface, so that the bearing ring 8 has an inner threaded surface directed toward the inner bearing ring, as is evident from Fig. 7. The ring 8 itself does not receive any of the races, as is the case with the embodiment of Fig. 1. Instead, an annular wedging ring 15 is in threaded engagement with the inner threads of the ring 8, the threads of the ring 15 being flush with those of the ring 8. The wedging ring 15 has an inner annular surface which forms part of a cone whose apex is located to the right of the bearing, as viewed in Fig. 7, and this apex is located on the common axis of the inner and outer bearing rings. A second wedge member 17 is located within the wedging ring 15, and the wedging ring 17 has an outer conical surface 16 which also forms part of the same cone of which the inner surface of the ring 15 forms a part. Both the outer wedging ring 15 and the inner wedging ring 17 are springy and are capable of expanding and contracting. Thus, as is most clearly shown in Figs. 7b and 7c, the wedging ring 15 is cut through at one point so as to be provided with a gap 15', enabling the ring 15 to expand and contract, and is shown in Fig. 7a, the wedging ring 17 is provided with a slot 21 extending from one side surface almost up to the other side surface and with an adjacent slot 21 extending from the opposite side surface almost up to the first side surface. A plurality of pairs of slots 21 as indicated in Fig. 7a are provided around the ring 17, so that in this way this ring 17 is capable of expanding and contracting. It will be noted that it is the ring 17 which is provided with the suitably shaped annular recess for accommodating the roller bearing races 7 and the ball bearing races 6. By turning the wedging ring 15 into the ring 8 so that the ring 15 advances to the left, as viewed in Fig. 7, it is possible to adjust the radial pressure in the direction of arrow A of Fig. 7 so as to adjust the roller race rings 7 in a very precise manner.

The extent to which the wedging ring 15 is expanded and contracted is controlled by providing the ring 15 with a lateral recess 19 (Figs. 7b and 7c), extending across the gap 15'. This recess 19 has opposite inclined surfaces which converge toward the gap 15', as is evident from Fig. 7b, and a clamping member 18 having mating side surfaces is located within the recess 19 and is connected to the ring 15 at opposite sides of the gap 15' thereof by screws 20, as is shown in Figs. 7b and 7c. It is apparent that when the screws 20 are tightened the wedging or clamping member 18 will advance to the left, as viewed in Fig. 7b, so as to expand the ring 15, and in this way once the ring 15 has its axial position in the bearing adjusted it is possible to press the ring 15 outwardly against the ring 8 so as to maintain the ring 15 in its adjusted position, and at the same time it is also possible to adjust the pressure applied to the races 7 by the rings 17 in this way. It will be noted that the openings of the clamping member 18 which receive the screws 20 have sufficient clearance for the screws 20 so that the latter can shift laterally with respect to the clamping member 18 in order to permit the ring 15 to be adjusted.

The above-described construction of Figs. 7–7c provides a completely uniform pressing of the races 7 throughout the entire circumference of the bearing. By maintaining the flanks of the threads flush against each other proper centering of the screwthreading is achieved. At the same time this construction permits continuous adjustments to be made, and, if necessary, subsequent adjustment within wide limits of the pre-tensioning of the roller bearing races 7 may be provided. In particular, the provision of the gap 15' with the clamping means 18—20 permits this result to be accomplished. The ring 15 may be quickly fixed in any position with the gap 15' having any desired width.

In those cases where it is not possible to use a threaded connection as indicated in Fig. 7, the embodiments of Figs. 8 and 9 may be used, the constructions shown in Figs. 8 and 9 being identical with that of Fig. 7 except that the threaded surface of the ring 8 and the threaded ring 15 are omitted. Referring to Fig. 8, it will be seen that the threaded ring 15 is replaced by a ring 115 having an inner surface forming part of the cone and engaging the ring 17 in the same way as the ring 15 of Fig. 7. However, the ring 115 extends outwardly to the left beyond the bearing ring 8 and has an annular flange extending alongside of the ring 8, this flange being indicated at 23. It will be noted that the ring 115 has an outer cylindrical surface slidably engaging an inner cylindrical surface of the bearing ring 8. The bearing ring 8 is provided with suitable threaded bores aligned with openings in the flange 23 so as to receive a plurality of screws 120, respectively, these screws being distributed about the axis of the bearing. By tightening or loosening the screws 120 the ring 115 can be axially adjusted so as to provide the desired radial pressure on the roller race ring 7. It will be noted that in Fig. 8 an additional ring 24 is located in engagement with the sealing gland 12 and next to the inner surface of the ring 115 just to the right of the wedging ring 17. This ring 24 is placed in position before the ring 115 is joined to the assembly. However, the ring 24 may be omitted if desired.

In Fig. 9, the ring 215 which corresponds to the ring 115, does not have any flange located at the exterior of the outer bearing ring which is shown as 208 in Fig. 9. Instead, the ring 215 is provided with suitable axially extending bores to receive the screws 220, and these screws 220 simply extend into aligned threaded bores formed in the bearing ring 208 at a position much closer to the inner bearing ring 9 than is the case with the embodiment of Fig. 8. By turning the screws 220 of the embodiment of Fig. 9 it is possible to achieve the same results as with the embodiment of Fig. 8.

Figure 10:
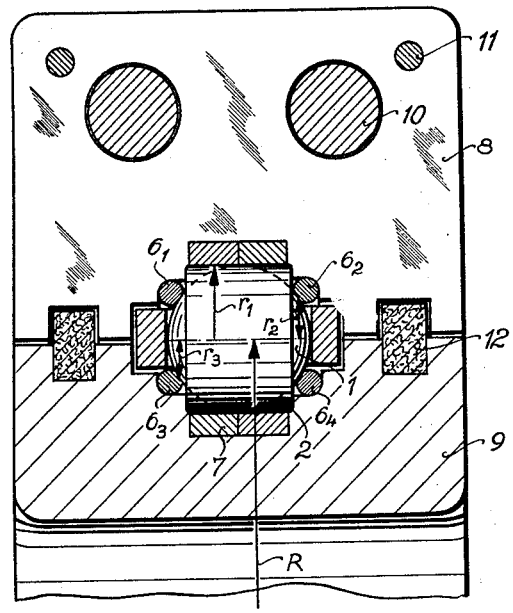
Fig. 10 is a fragmentary transverse sectional view of an embodiment of a bearing according to the present invention which is capable of withstanding stresses in a very particular way.

With a bearing having the construction shown in Fig. 1, it may happen that since there are balls and rollers in the bearing one of the types of rolling elements will tend to overtake the other and will thus produce undesirable friction in the leading rolling elements. The embodiment which is shown in Fig. 10 eliminates the possibility of such an undesirable result. Referring to Fig. 10 it will be seen that the rolling radius, or the radius of the rolling circle is indicated at R. This is the radius of a cylinder whose axis coincides with the common axis of the rings 8 and 9 and which includes the axes of the rollers as well as the axes of the balls which are parallel to the common axis of the rings 8 and 9. It will be noted that the race surfaces of the roller races 7 are each located at a radial distance $r_1$ from this cylinder. On the right side of a plane which is normal to the common axis of the rings 8 and 9 and which includes the centers of the balls 1 the rings $6_2$ and $6_4$ which form the ball races are each located at a radial distance $r_2$ from this cylinder whose radius is R, while on the left side of this plane the rings $6_1$ and $6_3$ are each located at a radial distance $r_3$ from this cylinder. The radial distances $r_2$ and $r_3$ are not equal to each other, and in fact the above problem is solved if:

$$r_3 = \frac{r_2(R+r_1)}{R-r_1+r_2}$$

The above function of the distances $r_2$ and $r_3$ can be easily applied since it is possible to arrange the ball races at any desired distances from the centers of the balls and the differences between $r_2$ and $r_3$ are not considerable.

In an actual construction of the type shown in Fig. 10, where the roller bearing has a diameter 2R of, for example, 980 mm., where the ball diameter is 35 mm. and where the roller diameter is 36 mm., the value of $r_2$ is 12.37 mm. and the value of $r_3$ is 12.65 mm.

It should be noted that in a construction where a clearance is provided between the balls and wires, leading on the part of one type of rolling element with respect to the other can occur only where an axial load is provided on the balls.

Figure 11:
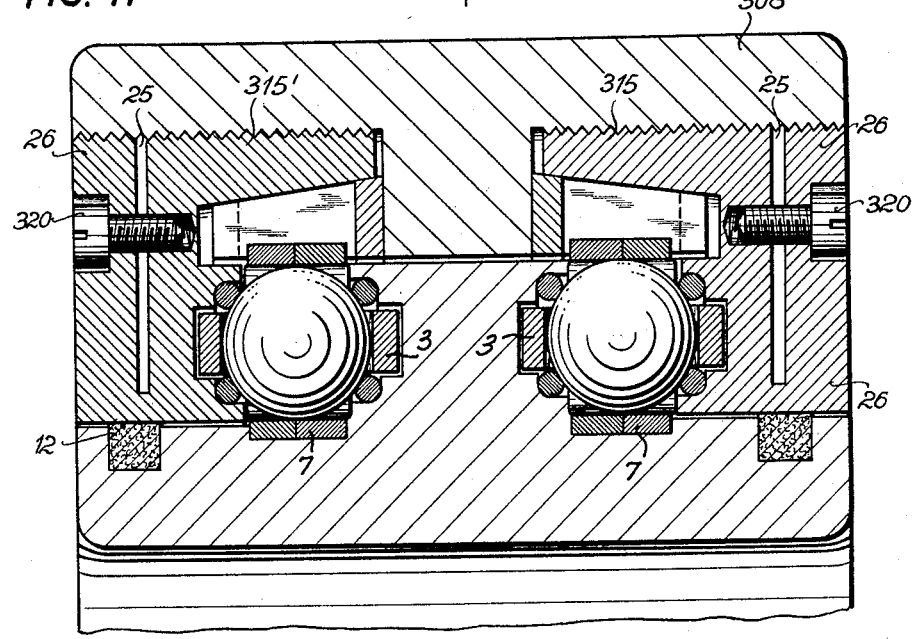
Fig. 11 is a transverse sectional elevational view of another embodiment of a bearing according to the present invention, the bearing of Fig. 11 being adjustable and being capable of absorbing axial forces from either direction.

The embodiment of the invention which is shown in Fig. 11 is particularly suitable for use as a double-thrust bearing capable of taking up unilaterally effective high axial loads as well as tilting loads. As may be seen from Fig. 11, the bearing includes an outer bearing ring member 308 provided with suitable recesses and threads to receive the threaded ring members 315 and 315'. These ring members are similar to the rings 15 described above in connection with Fig. 7 in that they have annular wedging surfaces which cooperate with springy rings 17 to adjust the radial pressure of the roller races. This radial pressure is adjusted by turning of the rings 315 and 315' with respect to the outer bearing ring 308. The rings 315 and 315' are maintained in their adjusted position by a clamping member 26. This member 26 is formed on each of the rings 315 and 315' by providing the latter with a tangentially extending slot 25 which thus provides each ring with the springy portion 26, and a screw 320 extends through an opening of the portion 26 into a threaded opening of the rest of the ring 315 or 315' so that by tightening the screw 320 it is possible to clamp the rings 315 and 315' in their adjusted positions. It will be noted that with the embodiment of Fig. 11 the rings 315 and 315' extend radially toward the axis of the bearing to an extent greater than the ring 15 of Fig. 7, so that these rings 315 and 315' are provided with recesses which accommodate the outer lateral wire races for the balls.

The force distribution with the embodiment of Fig. 11 is different from that of Fig. 1. With the construction of Fig. 1 an axial force is transmitted diagonally from an inner ball race to an outer ball race, while with the construction of Fig. 11 an axial force is transmitted from two inner ball races to two outer ball races.

The load which can be taken up diminishes proportionally as the supporting angle increases. The supporting angle is the angle between a line extending from the center of the ball to one of its races and the common axis of the bearing ring. With the embodiment of Fig. 1 this angle is 45°. It will be noted that the corresponding angle of the construction of Fig. 11 is substantially smaller. Thus, the load transmitted from one inner ball race to one outer ball race in the embodiment of Fig. 11 is larger than that which can be taken up by the construction of Fig. 1, and inasmuch as the load is transmitted from two inner ball races to two outer ball races in the embodiment of Fig. 11, it is apparent that this construction is capable of taking up very high axial loads.

Fig. 12 shows a bearing similar to that of Fig. 1. However, in Fig. 12 the inner bearing ring has an outwardly extending right flange, as viewed in Fig. 12, which supports the two right wire ball races, while the outer rings 308 have an inwardly directed opposed flange receiving the left ball races 306. The ball members 301 are shown in engagement with the ball races 306 in Fig. 12. It will be noted that with the construction of Fig. 12 the races 306 have different locations than is the case with Fig. 1, and with the positioning provided in the embodiment of Fig. 12 the supporting angles $\alpha_1$ and $\alpha_2$ are smaller than the supporting angles provided by the construction of Fig. 1. It will be noted that with the embodiment of Fig. 12 there are a pair of outer ball races and a pair of inner ball races 306, the outer ball races being equidistantly spaced from a plane normal to the common axis of the bearing rings and including the centers of the balls, while the inner races 306 are also equidistantly spaced from this plane. The points of contact 341—344 between the races and balls in the embodiment of Fig. 12 are shown as located along elements of a rolling cone 327 shown in dot-dash lines, this imaginary rolling cone 327 having a rolling angle $\beta$. Thus, it will be noted that the pair of inner ball races 306 are located nearer to the plane normal to the common axis of the bearing rings and including the centers of the balls than the outer ball races. It is preferred that the surfaces of the wire rings 306 which engage the balls be kept as narrow as possible so as to better guarantee that no undesirable heating of the bearings occurs.

As is indicated in Fig. 12, the outer bearing ring 308 may be made in two halves and the process of making this ring 308 may be identical with that described above in connection with the ring 8 of Fig. 1. Fig. 12 shows the positioning pins 311 which correspond to the pins 11 as well as the connecting screws 310 which correspond to the screws 10. However, it is also possible to make the ring 308 of one piece, and in this case there is no possibility of radial adjustment so that where a one-piece outer bearing ring is used the wire roller bearing races must be made within close tolerances.

In all of the embodiments of the invention if the wire roller races are placed in their operating positions while they are hot, these races will be pretensioned upon cooling.

It will be noted that with all of the above-described embodiments of the invention the ball elements together with the ball races make it possible to take up considerable axial stresses, while the rollers and their races make it possible to take up considerable radial loads and at the same time make it possible for the bearing to rotate at high speeds. It is also advantageous to provide between the balls and their races a greater clearance than between the rollers and the roller races. As was mentioned above when rolling-in the races for the balls the balls used for the rolling-in operation are slightly larger than the balls actually used in the final bearing, and the rolling-in balls may have a diameter which is 0.1 mm. larger than the final balls. With such a construction the wire races of the balls will not be stressed by radial forces, these latter forces being taken up only by the rollers and their races. With an arrangement as shown in Fig. 1, this clearance will provide the transmission of an axial load between the diagonally opposed ball races, as was described above, and will provide the axis of rotation of the balls which is inclined at an angle of 45° to the axis of the bearing, and there will be no sliding friction. The clearance of 0.1 mm. provided prevents any harmful results resulting from occasional contact between the balls and undesired wires. As a result of this clearance, the outer bearing ring member is capable of being displaced in an axial direction relative to the inner ring member by 0.1 mm., the direction of displacement depending upon the direction of the axial load. This slight axial movement does not have any detrimental effect on the rollers and their races.

Where the balls finally used in the bearings are used also for finish rolling of the ball races, the wire races for the balls participate in absorbing radial forces and also take up axial and tilting forces, since the above-described clearance is no longer present. Also, in this case the axis of rotation of the balls is no longer inclined to the axis of the bearing but instead is parallel to the bearing. It is preferred, however, to provide the above-described clearance between the ball races and the balls since it permits the bearing to rotate at higher speeds because the rollers and their races are able to provide in this way a pure rolling action without any sliding friction.

By arranging the balls and rollers along a single circle where they are maintained at predetermined angular distances from each other by a cage means, a considerable amount of space is saved.

It will be understood that each of the elements described above, or two or more together, may also find a useful application in other types of bearings differing from the types described above.

While the invention has been illustrated and described as embodied in combined ball and roller bearings, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A bearing comprising, in combination, an outer bearing ring and an inner bearing ring located coaxially within said outer bearing ring, said inner and outer bearing rings defining between themselves a predetermined annular space; a plurality of balls and rollers distributed along said annular space with the axes of said rollers being respectively parallel to the common axis of said rings; cage means located in said annular space and maintaining said balls and rollers at predetermined angular distances from each other; a plurality of ball wire races carried by said rings and engaging said balls, a predetermined clearance being provided between said balls and ball wire races; and a plurality of roller wire races carried by said rings and engaging said rollers, the clearance between said rollers and roller wire races being less than said clearance between said balls and ball wire races.

2. A bearing comprising, in combination, inner and outer coaxial bearing rings defining between themselves a predetermined annular space; a plurality of balls and rollers distributed along said annular space; cage means located in said annular space and engaging said balls and rollers to maintain the same at predetermined angular distances from each other; a plurality of first wire race means carried by said rings and engaging said rollers for providing raceways therefor; and a plurality of second wire race means carried by said rings and engaging said balls to provide raceways therefor, said plurality of second wire race means cooperating with said balls to provide for each ball a rolling axis making an angle of approximately 45° with the common axis of said rings when an axial thrust is applied against one of said rings.

3. A bearing comprising, in combination, an inner bearing ring; an outer bearing ring coaxially surrounding said inner bearing ring, said outer bearing ring having an inner annular threaded surface spaced from and directed toward said inner bearing ring; an outer wedging ring having an outer threaded surface in threaded engagement with said inner threaded surface of said outer bearing ring, said outer wedging ring having an inner annular surface forming part of a cone whose axis coincides with the common axis of said inner and outer bearing rings; an inner wedging ring surrounded by said outer wedging ring and surrounding said inner bearing ring, said inner wedging ring having in engagement with the inner surface of said outer wedging ring an outer surface also forming part of said cone, said inner wedging ring and said inner bearing ring defining between themselves a predetermined annular space; a plurality of balls and rollers distributed along said annular space; cage means located in said annular space and maintaining said balls and rollers at predetermined angular distances from each other; and a plurality of wire races carried by said inner bearing ring and said inner wedging ring and engaging said balls and rollers, whereby said outer wedging ring may be threaded axially along said outer bearing ring to adjust the pressure with which said inner wedging ring applies said races against said balls and rollers.

4. A bearing comprising, in combination, an inner bearing ring; an outer bearing ring coaxially surrounding said inner bearing ring, said outer bearing ring having an inner annular threaded surface spaced from and directed toward said inner bearing ring; an outer wedging ring having an outer threaded surface in threaded engagement with said inner threaded surface of said outer bearing ring, said outer wedging ring having an inner annular surface forming part of a cone whose axis coincides with the common axis of said inner and outer bearing rings; an inner wedging ring surrounded by said outer wedging ring and surrounding said inner bearing ring, said inner wedging ring having in engagement with the inner surface of said outer wedging ring an outer surface also forming part of said cone, said inner wedging ring and said inner bearing ring defining between themselves a predetermined annular space; a plurality of balls and rollers distributed along said annular space; cage means located in said annular space and maintaining said balls and rollers at predetermined angular distances from each other; and a plurality of wire races carried by said inner bearing ring and said inner wedging ring and engaging said balls and rollers, whereby said outer wedging ring may be threaded axially along said outer bearing ring to adjust the pressure with which said inner wedging ring applies said races against said balls and rollers, said wedging rings being expandable and contractible, and expanding means operatively connected to said outer wedging ring for expanding the same against the inner threaded surface of said outer bearing ring when the outer wedging ring has been located in an adjusted axial position.

5. A bearing comprising, in combination, an inner bearing ring; an outer bearing ring coaxially surrounding said inner bearing ring, said outer bearing ring having an inner annular threaded surface spaced from and directed toward said inner bearing ring; an outer wedging ring having an outer threaded surafce in threaded engagement with said inner threaded surface of said outer bearing ring, said outer wedging ring having an inner annular surface forming part of a cone whose axis coincides with the common axis of said inner and outer bearing rings; an inner wedging ring surrounded by said outer wedging ring and surrounding said inner bearing ring, said inner wedging ring having in engagement with the inner surface of said outer wedging ring an outer surface also forming part of said cone, said inner wedging ring and said inner bearing ring defining between themselves a predetermined annular space; a plurality of balls and rollers distributed along said annular space; cage means located in said annular space and maintaining said balls and rollers at predetermined angular distances from each other; a plurality of wire races carried by said inner bearing ring and said inner wedging ring and engaging said balls and rollers, whereby said outer wedging ring may be threaded axially along said outer bearing ring to adjust the pressure with which said inner wedging ring applies said races against said balls and rollers, said inner wedging ring being formed with a pair of slots one of which extends from one side surface of said inner wedging ring almost up to the other side surface thereof and the other of which extends from said other side surface almost up to said one side surface thereof, said slots being located closely adjacent to each other so as to render said inner wedging ring expandable and contractible, said outer wedging ring also being expandable and contractible; and expanding means cooperating with said outer wedging ring for expanding the same against said inner threaded surface of said outer bearing ring when the outer wedging ring has been located in a desired axial position.

6. A bearing comprising, in combination, an inner bearing ring; an outer bearing ring coaxially surrounding said inner bearing ring, said rings defining between themselves a predetermined annular space and said outer bearing ring being composed of a pair of annular ring parts located in side by side relation, one of said ring parts being formed at its face directed toward the other of said ring parts with an inner annular recess directed toward said inner ring and the other of said ring parts having an inner annular projection projecting into and slidably engaging said one ring part in said recess thereof; screw means cooperating with said ring parts for holding the same together with said annular projection in said recess, said projection defining at least part of said annular recess; a plurality of balls and rollers distributed along said recess; cage means located in said recess and cooperating with said balls and rollers for maintaining the same at predetermined angular distances from each other; and a plurality of wire races carried by said bearing rings and engaging said balls and rollers, some of the races which engage said rollers also engaging said annular projection.

7. A bearing comprising, in combination, inner and outer bearing rings coaxially arranged with said outer ring surrounding said inner ring, said rings defining between themselves a predetermined annular space; a plurality of balls and rollers distributed along said space; cage means located in said space and maintaining said balls and rollers at predetermined angular distances from each other; a plurality of circular wire roller races carried by said rings and engaging said rollers, said roller races each being located at a predetermined radial distance $r_1$ from a cylinder of radius R which includes the axes of said rollers and the axes of said balls which are parallel to the common axis of said rings; and two pairs of circular wire ball races carried by said rings and engaging said balls, said pairs of wire ball races being respectively located on opposite sides of a plane normal to said common axis of said rings and including the centers of said balls, the two wire ball races on one side of said plane each being located at a radial distance $r_2$ from said cylinder and the two wire ball races on the other side of said plane each being located from said cylinder at a radial distance $$r_3 = \frac{r_2(R+r_1)}{R-r_1+2r_2}$$

8. A bearing comprising, in combination, inner and outer bearing rings coaxially arranged with said outer ring surrounding said inner ring, said rings defining between themselves a predetermined annular space; a plurality of balls and rollers distributed along said space; cage means located in said space and maintaining said balls and rollers at predetermined angular distances from each other; a plurality of circular wire roller races carried by said rings and engaging said rollers; and a plurality of circular wire ball races carried by said rings and engaging said balls, said ball races including a pair of outer races and a pair of inner races, said outer races being located at a greater radial distance from the common axis of said rings than said inner races, the pair of outer races being equidistant from a plane normal to said common axis and including the centers of said balls and the pair of inner ball races also being equidistant from said plane, the distances between said inner ball races and said plane being smaller than the distances between said outer ball races and said plane.

9. A bearing comprising, in combination, inner and outer bearing rings coaxially arranged with said outer ring surrounding said inner ring, said rings defining between themselves a predetermined annular space; a plurality of balls and rollers distributed along said space; cage means located in said space and maintaining said balls and rollers at a predetermined angular distance from each other; a plurality of circular wire roller races carried by said rings and engaging said rollers, said roller races each being located at a predetermined radial distance from a cylinder which includes the axes of said rollers and the axes of said balls which are parallel to the common axis of said rings; and two pairs of circular wire ball races carried by said rings and engaging said balls, said pairs of wire ball races being respectively located on opposite sides of a plane normal to the common axis of said rings and including the centers of said balls, the two wire ball races on one side of said plane each being located at a predetermined radial distance from said cylinder different from the distance of each of the two wire ball races on the other side of said plane from said cylinder.

References Cited in the file of this patent

UNITED STATES PATENTS

| 1,256,672 | Forslund | Feb. 19, 1918 |
| 1,351,202 | Carroll | Aug. 31, 1920 |
| 1,877,486 | Brownlee | Sept. 13, 1932 |
| 2,040,489 | Large | May 12, 1936 |
| 2,112,754 | Annen | Mar. 29, 1938 |
| 2,220,027 | Scott | Oct. 29, 1940 |
| 2,283,312 | Boice | May 19, 1942 |
| 2,399,847 | Bauersfeld | May 7, 1946 |
| 2,624,105 | Virtue | Jan. 6, 1953 |

FOREIGN PATENTS

| 113,722 | Sweden | Apr. 3, 1945 |